US008482556B2

(12) United States Patent
Meunier et al.

(10) Patent No.: US 8,482,556 B2
(45) Date of Patent: Jul. 9, 2013

(54) DETACHABLE SCREEN FOR MULTIFUNCTION DEVICE SHOWING 3D DYNAMIC VIEWS

(75) Inventors: Jean-Luc Meunier, St. Nazaire les Eymes (FR); Stefania Castellani, Meylan (FR); Victor Ciriza, La Tour du Pin (FR); Denys Proux, Eybens (FR)

(73) Assignee: Xerox Corporation, Norwalk, CT (US)

( * ) Notice: Subject to any disclaimer, the term of this patent is extended or adjusted under 35 U.S.C. 154(b) by 694 days.

(21) Appl. No.: 12/689,737

(22) Filed: Jan. 19, 2010

(65) Prior Publication Data

US 2011/0175901 A1    Jul. 21, 2011

(51) Int. Cl.
G06T 15/00 (2006.01)
G06F 3/038 (2006.01)
G09G 5/00 (2006.01)
G06F 3/12 (2006.01)
G06K 15/00 (2006.01)

(52) U.S. Cl.
USPC .......... 345/419; 345/204; 345/619; 358/1.15; 358/1.18

(58) Field of Classification Search
USPC ................... 345/419; 715/705–710
See application file for complete search history.

(56) References Cited

U.S. PATENT DOCUMENTS

| | | | |
|---|---|---|---|
| 6,493,083 | B2 | 12/2002 | Parisi et al. |
| 7,200,765 | B2* | 4/2007 | Skurdal et al. ................ 713/323 |
| 7,692,809 | B2 | 4/2010 | McQuillan |
| 2003/0161004 | A1* | 8/2003 | Bolanos ....................... 358/1.18 |
| 2006/0197973 | A1 | 9/2006 | Castellani et al. |
| 2008/0112005 | A1* | 5/2008 | Murray et al. ................ 358/1.15 |
| 2008/0150921 | A1* | 6/2008 | Robertson et al. ............. 345/204 |
| 2009/0002391 | A1* | 1/2009 | Williamson et al. .......... 345/619 |
| 2009/0040370 | A1* | 2/2009 | Varanasi ....................... 348/376 |
| 2009/0044130 | A1 | 2/2009 | Saluja |

OTHER PUBLICATIONS

Xerox product literature for Xerox WorkCenter™ printer, downloaded from http://www.office.xerox.com/multifunction-printer/color-multifunction/workcentre-7655-7665-7675 on Dec. 23, 2009.
Konica product literature for bizhub™ C353P printer downloaded from http://kmbs.konicaminolta.us/content/products/models/bizhubC353P.html on Dec. 23, 2009.
U.S. Appl. No. 12/396,506, Roulland, et al.
U.S. Appl. No. 12/473,369, Deng, et al.
U.S. Appl. No. 12/273,779, Roulland.

* cited by examiner

*Primary Examiner* — Alexander Eisen
*Assistant Examiner* — Amit Chatly
(74) *Attorney, Agent, or Firm* — Fay Sharpe LLP

(57) ABSTRACT

A detachable display unit, an electromechanical device utilizing the display unit, and a method of use are disclosed. The display unit includes a communication link whereby data can be communicated between the display unit and the associated electromechanical device. The display unit includes a position sensor which provides position information for determining a current position of the display unit when detached from the associated electromechanical device. A graphical user interface displays a dynamic virtual representation of the associated electromechanical device based on the determined current position.

26 Claims, 8 Drawing Sheets

DETACHABLE SCREEN FOR MULTIFUNCTION DEVICE SHOWING 3D DYNAMIC VIEWS

CROSS REFERENCE TO RELATED PATENTS AND APPLICATIONS

The following references, the disclosures of which are incorporated herein in their entireties by reference, are mentioned:

U.S. application Ser. No. 12/396,506, filed Mar. 3, 2009, entitled COLLABORATIVE LINKING OF SUPPORT KNOWLEDGE BASES WITH VISUALIZATION OF DEVICE, by Roulland et al.;

U.S. application Ser. No. 12/473,369, filed May 28, 2009, entitled MULTI-LAYER DISPLAY, by Deng et al.; and U.S. application Ser. No. 12/273,779, filed Nov. 19, 2008, entitled SYSTEM AND METHOD FOR LOCATING AN OPERATOR IN A REMOTE TROUBLESHOOTING CONTEXT, by Roulland.

BACKGROUND

The exemplary embodiment relates to electromechanical devices such as multifunction devices (MFDs). It finds particular application in connection with a detachable display device with a graphical user interface (GUI) which provides three-dimensional (3D) dynamic views of the MFD to assist the user in troubleshooting various components of the MFD. While the exemplary embodiment is described in terms of troubleshooting, it should be appreciated that the system and method find application in device operation, training, and the like.

Multi-function devices (MFDs), such as printers, copiers, scanners, facsimile machines, combinations thereof, or the like, are generally equipped with a display, typically a touch screen with a graphical user interface (GUI), and a software-based operating system (OS) to perform essential machine functions and implement various jobs the device is capable of performing. Complex and sophisticated devices, particularly high-speed MFDs, are subject to various problems and faults related to the software or hardware.

Problems that occur at low, non-periodic rates are difficult to replicate and thus difficult to resolve. Traditionally, a user seeking resolution often resorts to telephoning a service agent or manufacturer to guide them through a troubleshooting sequence that is intended to resolve the problem or identify the cause. More recently, business arrangements between the customer and the equipment supplier hold the user responsible, at least in part, for some maintenance and basic troubleshooting of the equipment. To aid the user, the GUI may provide instructions on a standard fixed repair procedure. More recently, systems have been developed which provide access to a searchable knowledge base (SKB) which allows the user to identify a case which appears to match the problem. Once identified, one or more corresponding solutions are displayed to the user as a series of repair procedures alongside a graphical representation of the hardware components affected.

Typically, the user is not technically trained to diagnose and/or service the MFDs and therefore may find it difficult to relate the physical device and its hardware components to the repair procedures and graphical representations displayed on the GUI. Since the display is generally disposed on top of the MFD, the display and the corresponding repair procedures are out of the user's field of view when performing repairs on the device's interior or sides. The displayed repair procedure, despite its quality, requires some mental effort to be related to the physical device. In other words, users often find it difficult to locate a component indicated or highlighted on the display, in part, because the displayed view is not contextualized to the users perspective.

There remains a need for a system and method of providing dynamic 3D views of an MFD and its components on a display which provides better assistance to users in performing repair procedures.

Incorporation by Reference

The following references, the disclosures of which are incorporated herein in their entireties by reference, are mentioned:

U.S. Publication No. 2006/0197973, filed Mar. 1, 2005, entitled BI-DIRECTIONAL REMOTE VISUALIZATION FOR SUPPORTING COLLABORATIVE MACHINE TROUBLESHOOTING, by Castellani et al.;

U.S. Pub. No. 2009/0044130, published Feb. 12, 2009, entitled MULTIPLE JOB SUBMISSION FROM LOCAL USER INTERFACE, by Saluja;

U.S. Pat. No. 6,493,083, issued Dec. 10, 2002, entitled METHOD FOR MEASURING COLOR REGISTRATION AND DETERMINING REGISTRATION ERROR IN MARKING PLATFORM, by Parisi et al.; and U.S. Pat. No. 7,155,277, issued Dec. 12, 2006, entitled PRINTER HAVING REMOTE TRANSMISSION CAPABILITIES, by McQuillan.

BRIEF DESCRIPTION

In accordance with one aspect of the exemplary embodiment, a detachable display unit is disclosed. The display unit includes a communication link which communicates data between the display unit and an associated electromechanical device, the data being characteristic of a current state of the associated electromechanical device. At least one position sensor provides position information for determining a current position of the display unit, relative to the electromechanical device, when it is detached from the associated electromechanical device. A graphical user interface displays a dynamic virtual representation of the associated electromechanical device based on the determined current position.

In another aspect, a method for generating a display of an electromechanical device includes communicating data characteristic of a current state of an electromechanical device to a detachable display unit. When the detachable display unit is in a position detached from the electromechanical device, a current position of the detachable display unit, relative to the electromechanical device, is determined. A dynamic virtual representation of the electromechanical device is generated, based on the determined current position. The dynamic virtual representation is displayed on the detached display unit.

In another aspect, an electromechanical device includes a detachable display unit. The display unit includes a graphical user interface and at least one position sensor which determines at least one of a spatial position and an orientation of the display unit, relative to base position. A docking assembly selectively receives the detachable display unit in the base position. A display system generates a dynamic virtual representation of the electromechanical device which changes based on changes in the determined at least one of the spatial position and orientation of the display unit and displays the dynamic virtual representation on the graphical user interface.

DETAILED DESCRIPTION

Aspects of the exemplary embodiment relate to an electromechanical device, such as a multifunction device (MFD) which includes operational components which, among them, provide a plurality of functions, allowing a user to select from a plurality of available operations which incorporate the various functions. The MFD may be an image rendering device in which the operations may includes one, two or more of printing, copying, faxing, scanning, scan to email, and the like. In one embodiment, the device includes a printer which performs a printing operation by applying a marking media, such as ink, toner, or the like, to a print media, such as paper, film, or the like. The exemplary embodiment finds particular application in connection with troubleshooting and diagnostic systems for users of MFDs in, for example, an office setting.

A detachable display unit for the MFD is configured for displaying a virtual representation, e.g., a three-dimensional (3D) virtual representation of the MFD. The virtual representation assists a user by guiding the user to perform actions on user-actuable components of the device, generally to resolve a problem with the device, such as a component malfunction, a need for replenishment or replacement of consumables, such as paper, ink or toner, to remove a paper blockage in the paper path network, adjust settings, and so forth. In normal operation, the display is seated on the device and functions as a conventional device display, assisting a user in performing device functions, such as printing, copying, and the like.

While the exemplary apparatus and method are described in terms of an image rendering multifunction device with printing, scanning, and/or other functions or the like, it is to be appreciated that the system and method are equally applicable to other complex electromechanical devices with which a user may encounter problems that are not readily solved using the user's general experience of the machine.

Figure 1:
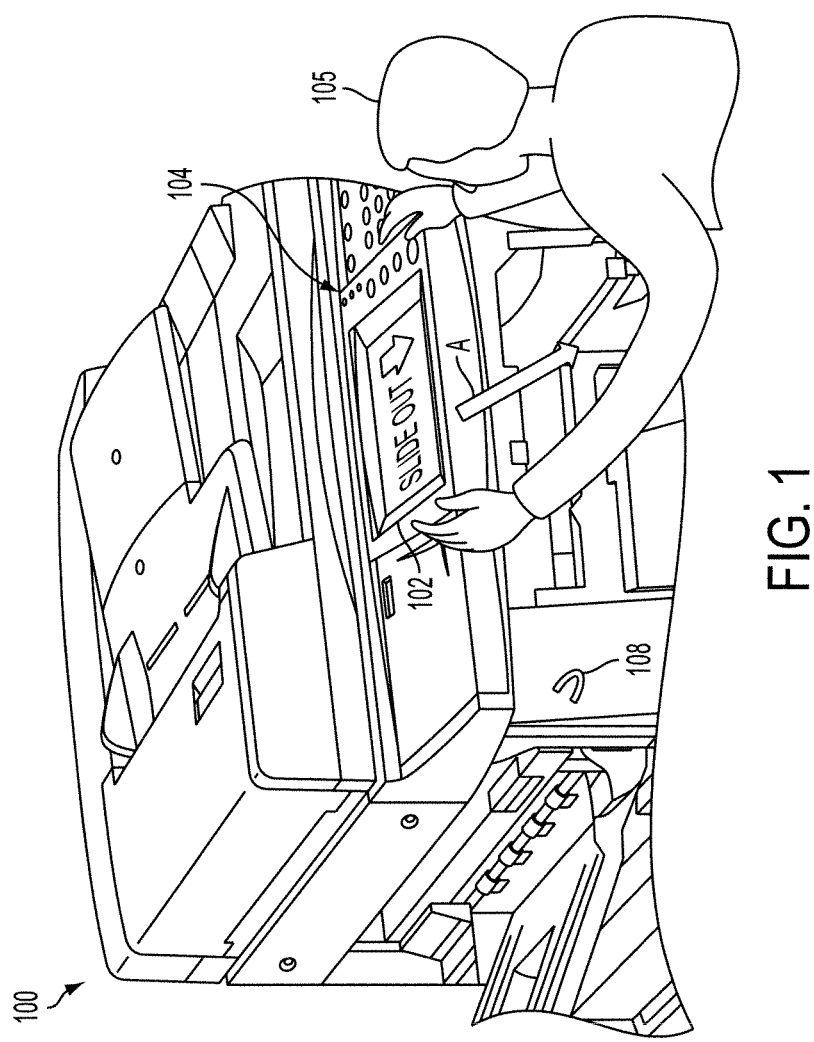
FIG. 1 is a perspective view of a multifunction device (MFD) which incorporates a detachable display unit docked on the MFD.
Figure 2:
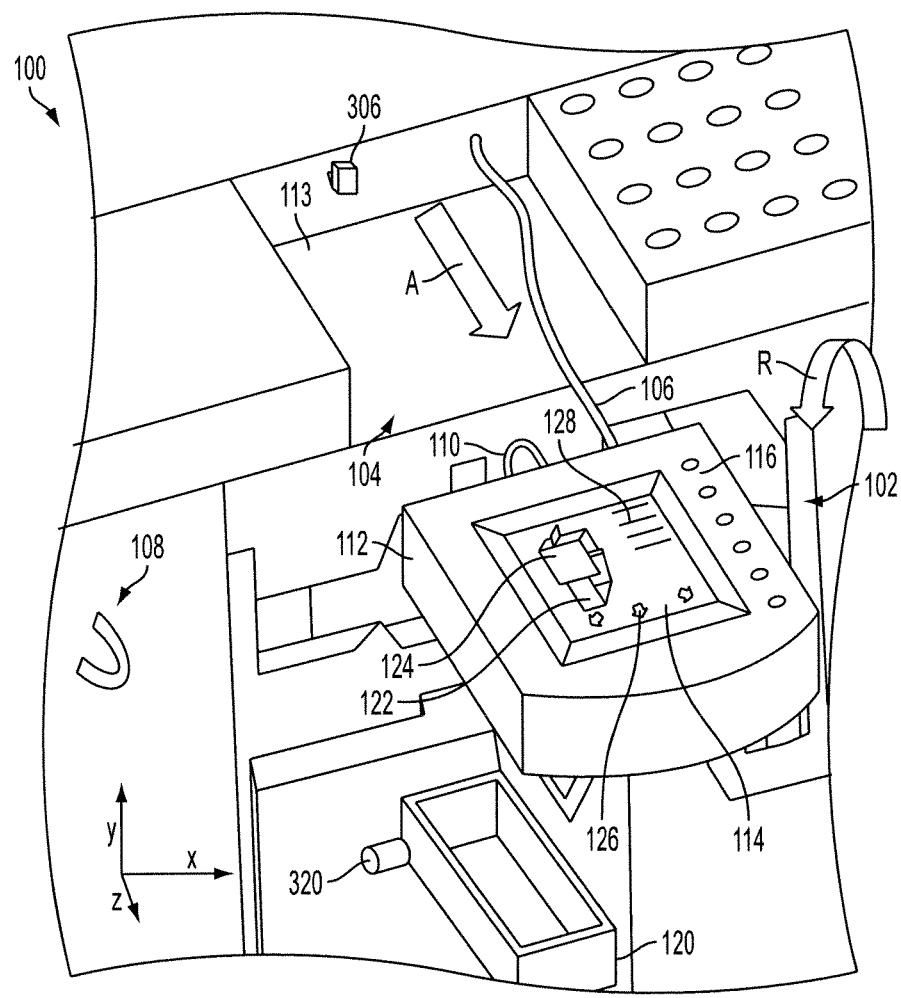
FIG. 2 is a perspective view of the MFD with the detachable display unit undocked displaying dynamic 3D virtual representations.

FIG. 1 illustrates an exemplary multifunctional device (MFD) 100 that includes a detachable display unit 102. The display unit 102 can be utilized by a user to facilitate troubleshooting a malfunctioning component. The display unit 102 can be utilized proximate to the MFD 100 during a troubleshooting session. FIG. 1 shows the display unit 102 in a docking position, in which it is removably mounted to an upper surface of the MFD. The display unit 102 can be detached from a docking assembly 104 of the MFD by a user 105 and moved to a current position, spaced from the docking assembly, as shown in FIG. 2. The display unit can be held by the user in this position, such that the user can view a dynamic 3D virtual representation of an appropriate component of the MFD 100 while simultaneously performing a user action, e.g., repairing a malfunctioning component. In one embodiment, the MFD 100 provides a wired communication link 106 to the display unit. However, the MFD 100 can utilize known wired and/or wireless protocols to facilitate communication of data between the MFD 100 and the display unit 102.

The display unit 102 can be removed from the docking assembly 104, for example, by pulling it forward in the direction of arrow A to a position spaced from the docking position. From there, it can be moved in three dimensions, illustrated by arrows x, y, z (e.g., up, down, sideways, forward and back) and reoriented, e.g., tilted from the horizontal orientation of the docking position to an orientation closer to vertical, as illustrated by arrow R, making the screen more easily seen by a user positioned in front of the MFD.

As illustrated in FIG. 2, when removed from the docking assembly 104, the display unit 102 can be temporarily mounted in a second position using a mounting member, such as a hook 108, e.g., located on a panel on the MFD. For this purpose, the unit has a corresponding mounting member 110, here shown as a loop.

Users of MFDs often encounter problems that can be easily remedied when provided with appropriate visualization of the component and procedures, in particular internal components not easily viewed by the user. In order to expedite solution of such problems, the display unit 102 provides the user with the dynamic 3D virtual representation of the MFD 100 while the user is acting on one or more of the MFD components. The 3D virtual representation is rendered on the display unit 102 according to the current position and orientation of the detachable display unit, relative to the electromechanical device, thus providing a contextualized view of the 3D model rather than an image of the MFD.

With continuing reference to FIG. 2, the display unit 102 includes a housing 112, shaped to be received in a cradle 113 defined by the docking assembly 104. A display screen 114 is mounted to the housing 112. The display screen 114 may be a touch screen. Alternatively or additionally, a keypad 116 maybe be provided on the display unit, which includes user-actuable controls.

The MFD 100 includes various components upon which a user can perform user actions. As an example of a component, FIG. 2 shows a waste bin 120, which is also graphically visualized on the display screen 114 at 122 in a 3D virtual representation 124 of the user-actuable components of the device 100.

Figure 3:
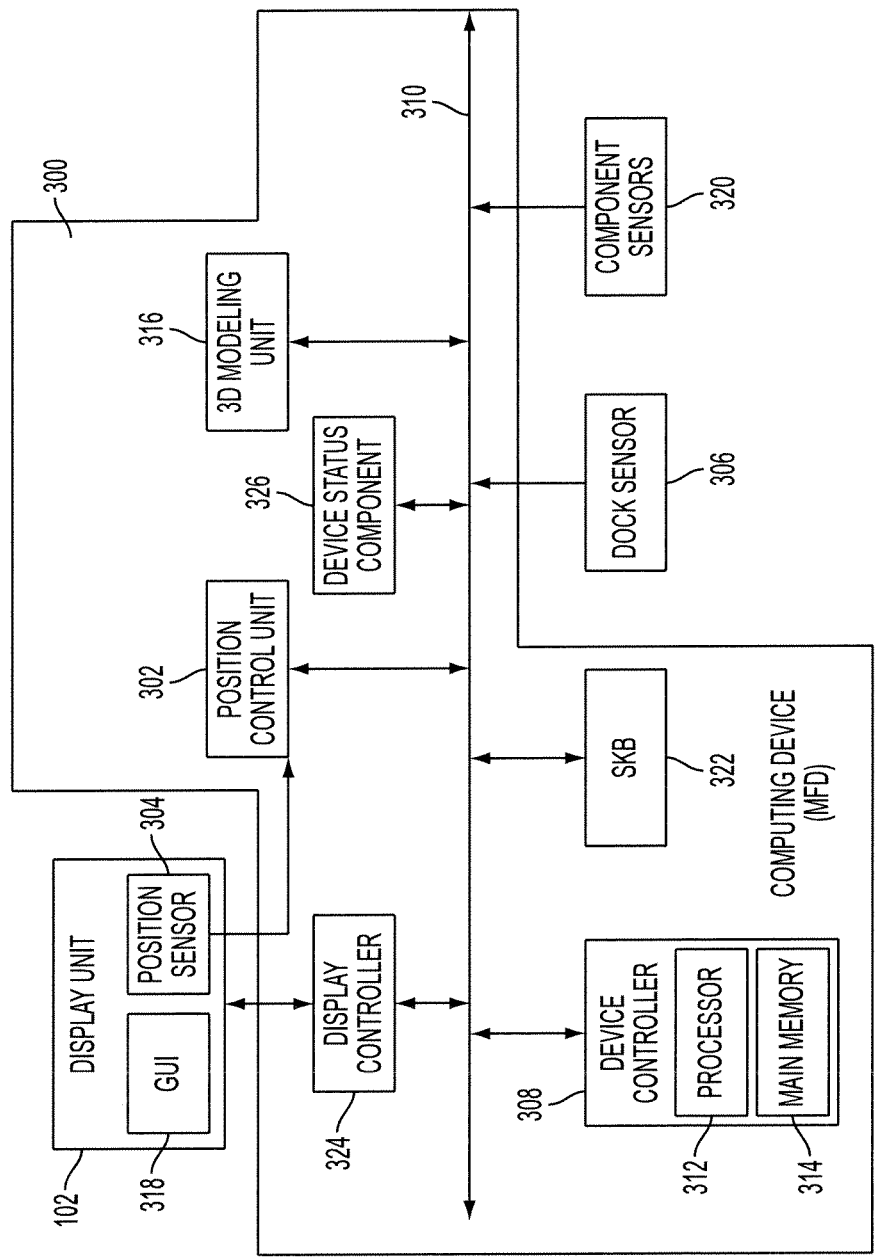
FIG. 3 is a functional block diagram of the multifunctional device and display system.

FIG. 3 illustrates an exemplary dynamic display system 300 which makes use of the detachable handheld display unit 102 in order to assist a user in troubleshooting an MFD 100 containing several components. The display system 300 includes a position control unit 302 that tracks the location and orientation of the display unit 102, relative to the MFD, in particular, relative to a stationary part of the MFD. While the position control unit 302 is shown as being resident on the MFD, it is also contemplated that the position control unit 302 may be resident on the display unit 102 and communicate position and orientation information to the MFD, e.g., via link 106. The display unit 102 includes a position sensor 304 which provides real-time position data to the position control unit 302. The position sensor 304 includes, for example, at least one three-axis accelerometer which measures acceleration vectors in three orthogonal directions. The position sensor 304 provides position information, such as the acceleration vectors, to the position control unit 302. The position control unit can determine the distance traveled relative to a base position, such as the position of the unit 102 in the docking cradle 113. In this manner, the position sensor location can be tracked to a specific location in space, and hence the display unit's position, relative to the MFD.

The display unit 102 is initialized to a base position, e.g., in the docking assembly 104, in order to establish a point of reference for movement therefrom. In order to establish a base position of the position sensor 304, the display unit 102 is placed in the docking assembly 104, which provides a predefined position relative to the position control unit 302. Once the base position is established, the position and orientation of the display unit 102 can be easily ascertained at substantially any frequency. A docking sensor 306 (FIG. 2) monitors whether the display unit 102 is attached to (seated in) or detached from the docking assembly 104. While docked, the base position of the display unit 102 is established and maintained. Once the display unit is removed from the dock to a first detached position, the docking sensor 306 detects its absence, which triggers the position control unit 302 to initiate tracking of the display unit 102.

The position control unit 302 interfaces to a device controller 308, e.g., over a system bus 310 and/or link 106. In this way, the position control unit 302 provides the location and orientation of the display unit 102. The docking sensor 306 also provides the device controller 308 with an initiation signal for tracking. The device controller 308 can utilize software to process the data received from the various components of the display system 300 via the system bus 310. In one embodiment, the device controller 308 supports the systems and methods described herein.

It is to be appreciated that any suitable computing device can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

In one embodiment, the device controller is hosted by the digital front end (DFE) of the MFD 100. The device controller 308 can employ a digital processor 312 which executes instructions stored in computer memory 314. The system bus 310 may couple various system components including the system memory to the processor 312. The processor 312 can be variously embodied, such as by a single-core processor, a dual-core processor (or more generally by a multiple-core processor), a digital processor and cooperating math coprocessor, a digital controller, or the like.

The system bus 310 can be any of several types of bus structure including a memory bus or memory controller, a peripheral bus, and a local bus using any of a variety of commercially available bus architectures.

The memory 314 may include read only memory (ROM) and random access memory (RAM). The memory 314 can further include at least some form of computer readable media such as a hard disk drive, a magnetic disk drive, e.g., to read from or write to a removable disk, and an optical disk drive, e.g., for reading a CD-ROM disk or to read from or write to other optical media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the device controller 308.

Device controller 30 may also control the MFD 100, based on instructions stored in main memory 314.

A user may enter commands and information via a user input device, such as the keypad 116, touch screen 114, or other input devices not shown. The display screen 114 may be connected to the system bus 310 via an interface, such as a video adapter (not shown).

The user is assisted by being provided with a dynamic 3D virtual representation 124 of at least a part of the MFD 100 in which a representation 122 of a malfunctioning component is highlighted or otherwise identified, e.g. by a tag 315 which provides the name of the part and optionally other information. The display system includes a 3D modeling unit 316, which generates the dynamic 3D representation of the MFD 100 and its components. The 3D virtual representation 124 includes at least the parts of the MFD 100 that will be visible or actionable by the user in the context of the repair; other parts may be omitted from the representation. Such a representation 124 may include paper storage trays, access doors, moveable levers and baffles for accessing jammed sheets in the paper path, marking media replaceable containers, such as toner cartridges or ink containers, waste toner receptacles, other replaceable items, such a photoreceptors belts and fuser roll heaters, finisher components, such as collection trays, stapling devices, and the like. As well as visualizing these components 120, the 3D virtual representation visualizes appropriate user actions, such as opening doors, turning levers, lifting baffles and so forth which may be used to access and/or repair a component. See, for example U.S. application Ser. No. 12/396,506 and US2006/0197973A1, incorporated reference, which describe an exemplary 3D modeling unit and a method of linking the knowledge base with the 3D modeling unit 316. In particular, a links database (not shown) can be used to link problems and solutions extracted from the SKB 322 with the 3D model generated by the modeling unit 316, although in the present case, the 3D model also takes into account the position and orientation of the display unit, e.g., relative to the MFD.

The 3D modeling unit 316 can provide a view in three dimensions based on the determined position and orientation of the display unit 102 when handled by the user to give them a more realistic visual experience. For example, the display unit 102 mimics a viewfinder of a camera to guide the user to the malfunctioning component of the MFD 100. As the display unit 102 moves, the graphical representation 124 on the display changes accordingly. The 3D modeling unit 316 receives the relative position and orientation of the display unit 102 from the device controller 308 via the system bus 310. The dimensions of the MFD along with the dimensions and locations of the components are known, such that the position and orientation of the display unit 102 can relate to the specific location of the components. While the virtual representation is described as a 3D virtual representation, two dimensional representations of the MFD 100 are also contemplated.

The 3D virtual representation 124 is provided to the device controller 308 via the system bus 310 to be displayed via a graphical user interface (GUI) 318 of the display unit 102 which incorporates the screen 114 and user input device 116. The GUI 318 allows users to receive instructions and perform a series of actions such as changing device configurations, preferences, requesting that the MFD perform actions, such as copying, faxing, scanning, or the like in addition to troubleshooting the MFD 100. In the event of a malfunction, a component sensor 320 (FIG. 2), associated with the malfunctioning component 120 in question, signals to the device controller 308 via the system bus 310 that a malfunction is present. The device controller 308 communicates to the GUI 318 via the system bus 310 to report to the user that a problem is present.

A searchable knowledge base (SKB) 322 interfaces to the device controller 308 via the system bus 310 to provide textual information and instructions related to the component 120 to the GUI 318. If the user is relatively familiar with the problem and/or the device 100, the user can follow the instructions provided to the GUI 318 without undocking the display unit 102. However, if the user is inexperienced with the reported malfunction the user can detach the display unit 102, which initiates the tracking and changes the display of the 3D virtual representation of the MFD 100.

Figure 4:
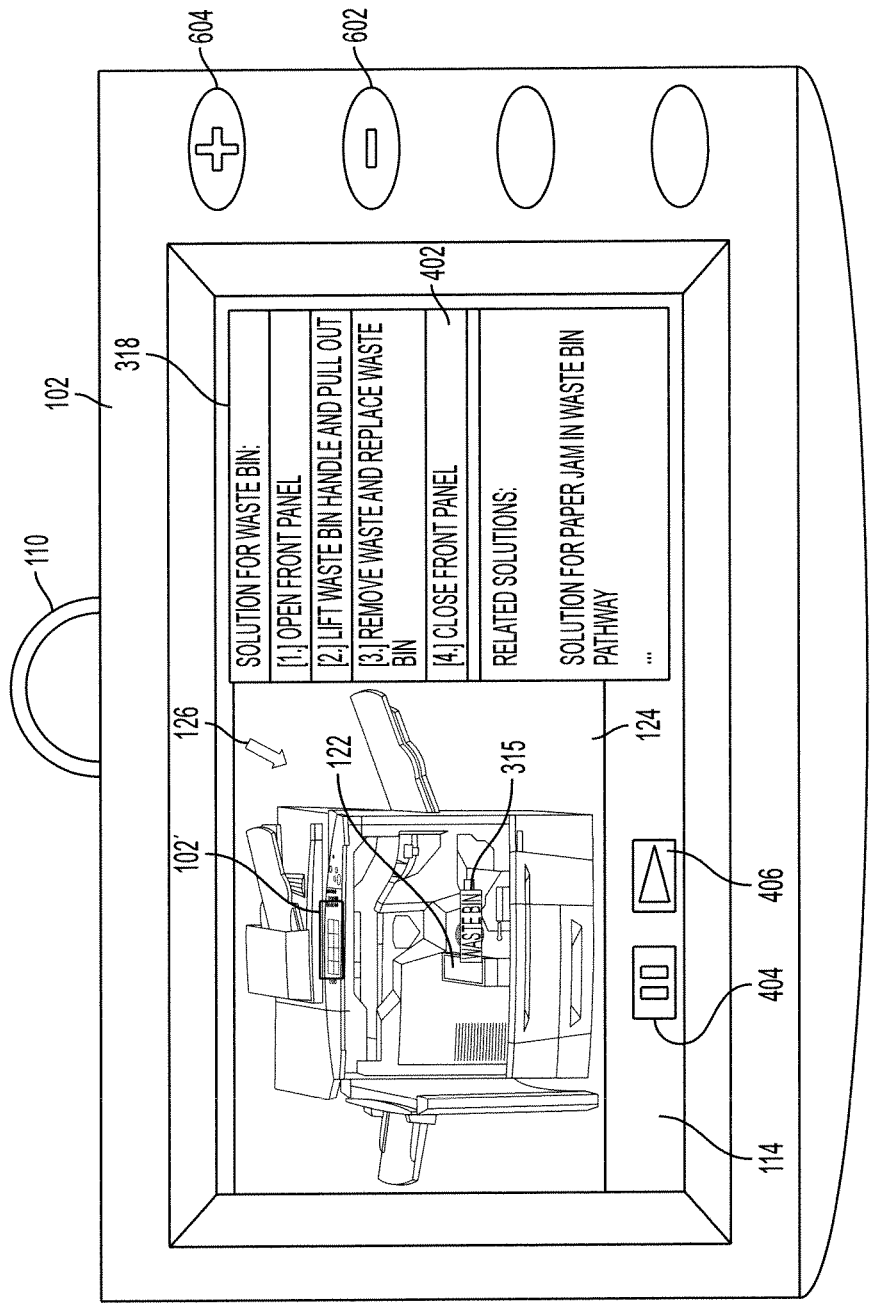
FIG. 4 is an enlarged perspective view of the detachable displaying unit illustrating one embodiment of the dynamic 3D virtual representation.

As illustrated in FIG. 4, the malfunctioning component representation 122 is highlighted along with visual indicators 126, such as arrows, for guiding the user to the location of the highlighted component. In addition to the virtual representation 124 and visual indicators 126, the GUI 318 can display textual information 318, such as instructions 402, adjacent to the device model 124. The textual instructions are retrieved from the SKB 322 by the controller 308. The instructions can be static. Or, they can be dynamic, e.g., based on the position and orientation of the display unit 102 or based on the performed user actions signaled by component sensors 320. By dynamic, it is meant that the textual instruction change in order, complexity, detail, or the like based on the position and orientation of the display unit 102 and/or user actions. For example, if the first instruction is "open the front panel" and a front panel sensor detects that the panel is open, as shown in FIG. 2, this instruction may be grayed out to indicate that this action has been performed.

The SKB 322 can be a structured electronic database of problem statements (cases) which maybe a short textual description of a known problem linked to the malfunction component and a one or more solution statements which describe steps for resolving the problem. The solutions can each comprise a sequence of one for more steps for a user to perform in attempting to resolve the problem. A solution sequence may be composed of at least two parts: a title, which basically describes what needs to be done, and a description, which gives step by step instructions to the user to fix the problem. The problem statements may be stored as hypertext documents, such as extensible markup languages (XML) documents, which are annotated with tags, which link the problem statements to the associated solutions. While the SKB may be located in memory 314 of the MFD 100, in other embodiments, it is accessed remotely, e.g. via a network, such as the internet, or a local area network.

A device status component 326 receives feedback from the device 100 concerning its status, e.g., from component sensors 320 and communicates with the controller when a fault is detected. In the event that a user identifies a problem (or even when a problem is detected via a component sensor 320) one or more root causes may exist for the observed problem which may each include one or more solutions sequences. The SKB 322 may be indexed according to the content of the problem statements only, or both the problem statements and the solutions. In this manner, the user can select a problem statement and then detach the display unit 102 to attempt to resolve the problem by performing one of the linked solution sequences. Alternatively, the user can detach the display unit 102 prior to selecting a problem statement. The solutions can be ranked based on a determination by the status component 326 of the most likely cause(s) of the problem and their solutions.

FIG. 4 illustrates the detachable display unit 102 with the displayed GUI 318. The illustrated display unit 102 includes a display panel 114 that is responsive to touch. By touch sensitive, it is meant that the display panel 114 generates touch data responsive to a user's finger "touch", for example, through sensing pressure or local changes in an electrical property such as resistivity or capacitance changes, heat, light, or motion sensing which detects a user's finger when positioned in touching or close proximity to the panel 114. The generated touch data, e.g. electrical signals, allows an identification of the location of the finger touch on the panel for controlling operation of the device based therefrom.

The display screen 114 may be addressable by a display controller 324 (FIG. 2) via the communication link 106 (FIG. 2) which causes the display screen 114 to display the dynamic 3D virtual representation 124, textual information 318, and optionally other graphics, such as user selectable graphic objects, e.g. tabs, buttons 404, 406, and the like (FIG. 4). The touch data is communicated to the display controller 324 which adjusts the graphics in a predetermined manner, based on the contact area. In normal operation, information from the display controller 324 is communicated to the device controller 308 via the system bus 310, which uses this information to control the operation of the MFD 100. In the exemplary embodiment, the display screen 114 is an LCD display panel; however, OLED, plasma, SEC, CRT, or the like panels are also contemplated.

The position controller 302, 3D modeling unit 316, display controller 324 and device status component 326 may be implemented in hardware or software or a combination thereof. In one embodiment, those components are in the form of software instructions stored in memory, such as memory 314 or a separate memory, and executed by a processor, such as processor 312, or by a separate processor. While in the exemplary embodiment, each of these components is resident on the same computing device it is contemplated that one or more of them may be resident on a separate computing device and communicatively linked to the device controller 308.

With returning reference to FIG. 4, in a troubleshooting mode, the GUI 318 includes the dynamic 3D virtual representation 124 of the MFD 100 and the related textual information 318 retrieved from the SKB. In the illustrated embodiment, the information includes instructions 402 for resolving a problem. The GUI can also include a pause, or freeze, function implemented as a soft button 404; however, assigning a physical, or hard, button is also contemplated. The pause function acts to maintain the current 3D virtual representation 124 regardless of changes in the display unit's 102 position or orientation. For example, the user may require both hands to perform a suggested user action. In this case, the user can pause the current 3D virtual representation and set the display unit 102 on the floor or onto a hook 108 or alternate cradle (FIG. 2). The hook 108 or alternate cradle may be located on an inside face of an access panel or at any number of locations which may facilitate the user in performing various user actions. Once the user action is completed, the user can pick up the display unit 102 and resume the dynamic model of the MFD 100 by touching the soft button 406 to active the play, or unfreeze, function. It should be noted the play and pause functions can alternatively utilize the same button.

As an example, the waste bin 120 of the MFD is sensed as being full and it is suggested that it be cleaned. For example, a component sensor 320 detects that the waste bin 122 is full and communicates sensing information to the device controller 308 indicative of a full state. The device controller 308 communicates with the GUI 318 and thereby reports to the user the status of the waste bin 122. The GUI of the display unit 102 still attached, or docked, to the MFD displays a graphical representation 124 of a part of the MFD including a representation 122 of the waste bin together with textual instructions 402.

If the user is not familiar with the location of the waste bin 122, the user may detach the display unit 102 from the docking assembly 104, upon which the graphical representation 124 displaying the MFD becomes a position-responsive 3D model. Given a current position and orientation of the display unit with respect to the base position, e.g., the docking assembly 104, the GUI can render the 3D model adapted to the display unit position and orientation, as decided by the user. Visual indicators 126 can guide the user to position the display unit in close proximity to the actual waste bin 120 (highlighted on the screen) at which point further detailed textual instructions 402 regarding waste bin removal can be presented adjacent to the rendered 3D model 124.

Figure 5:
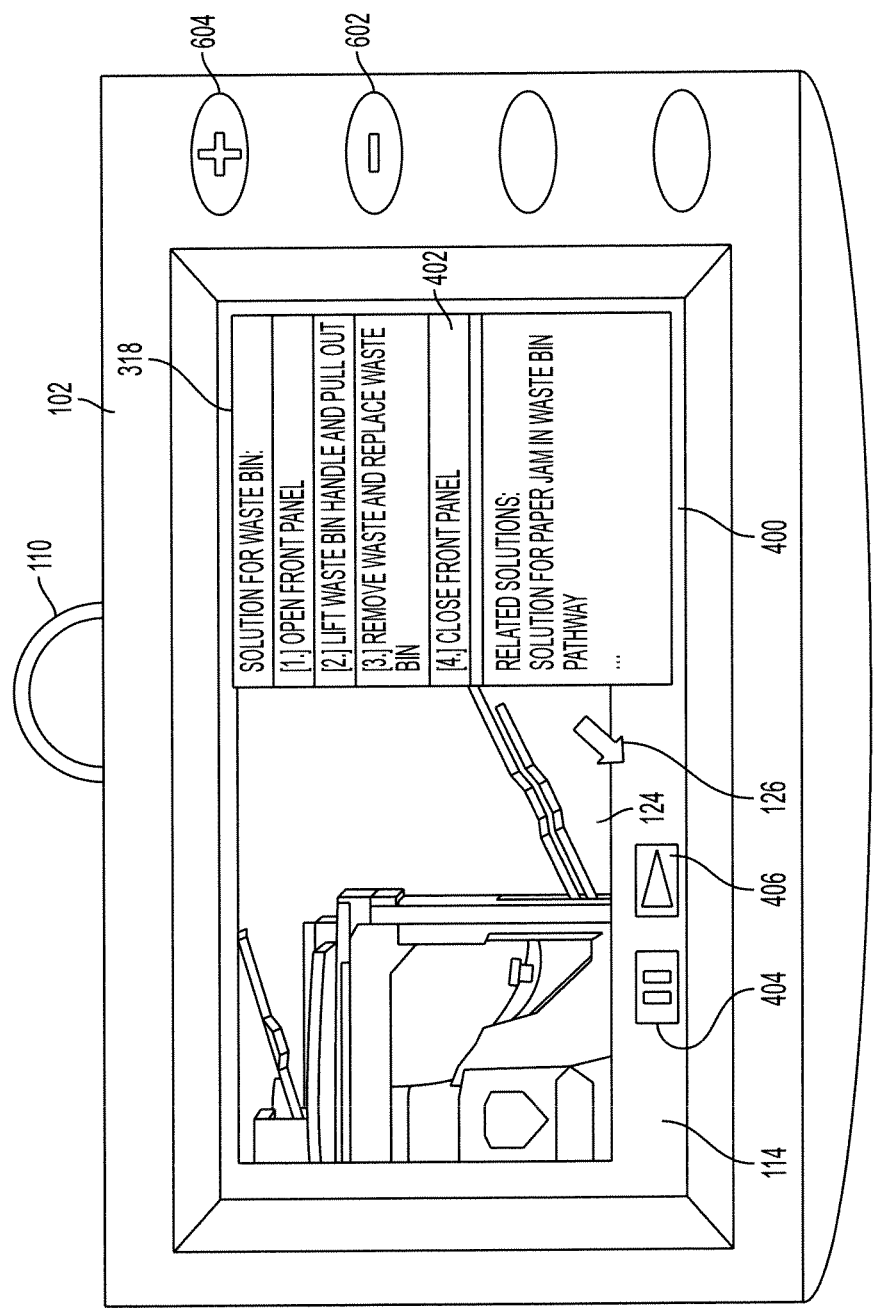
FIG. 5 is an enlarged perspective view of the detachable displaying unit illustrating another embodiment of the dynamic 3D virtual representation.

With reference to FIG. 5, as the user moves the display unit 102, given the current position and orientation, the 3D virtual representation 124 may represent a different component of the MFD 100, for example the input tray. A visual indicator 126 may be displayed to guide the user to move the display unit 102 towards the waste bin.

Figure 6:
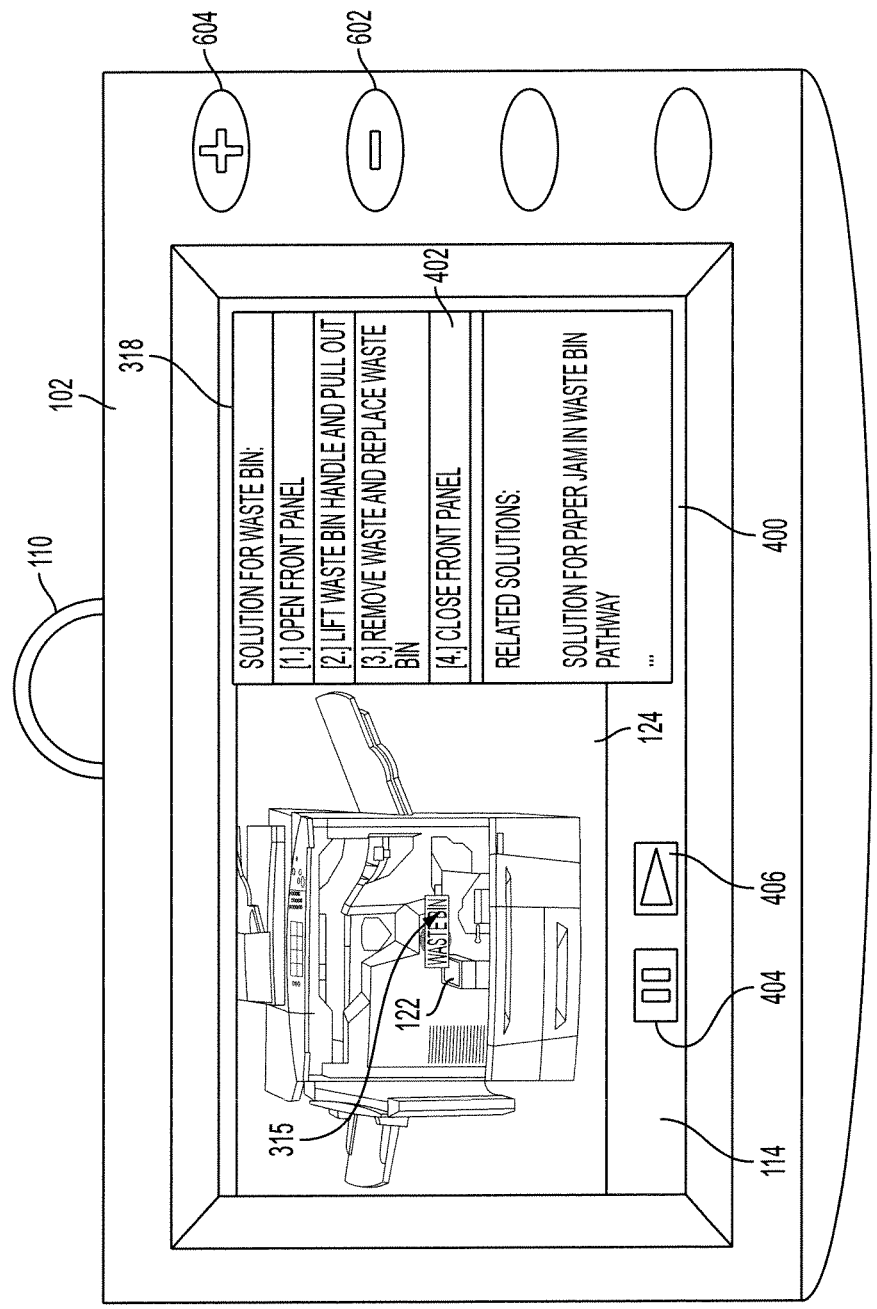
FIG. 6 is an enlarged perspective view of the detachable displaying unit illustrating another embodiment of the dynamic 3D virtual representation.

With reference to FIG. 6, in the case that the user still has difficulty locating the waste bin he/she can zoom out such that the 3D representation 124 may appear as illustrated. The zoom in and out functions may be implemented as hard buttons 600 and 602, respectively; however, soft buttons integrated into the GUI 318 are also contemplated. In another embodiment, the user can step back from the MFD 100 while holding the display unit 102. The position control unit 302 determines that the display unit 102 is further away from the MFD 100, thus actuating zoom functions based on the position of the display unit 102.

Figure 7:
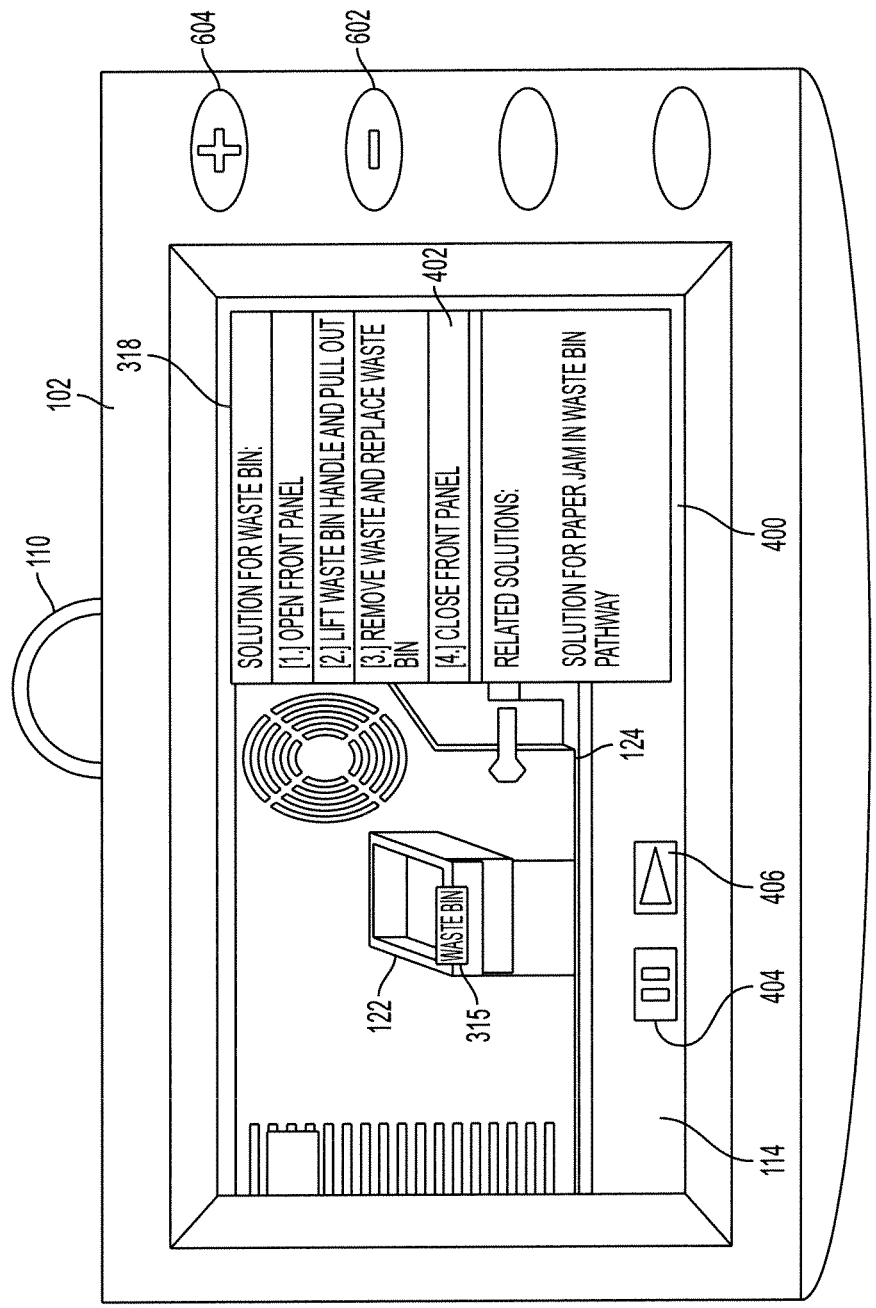
FIG. 7 is an enlarged perspective view of the detachable displaying unit illustrating another embodiment of the dynamic 3D virtual representation.

FIG. 7 illustrates the 3D virtual representation 124 when the user has the display unit 102 physically proximate to the waste bin 122, at which point the user may pause the current 3D representation 124 and set the display unit down or place it on hook 108 or in alternate docking assembly. Once the user action is completed, the user replaces the display unit 102 into the docking assembly 104, at which point the docking sensor 306 triggers the termination of the dynamic 3D virtual representation 124 of the MFD 100 and any textual instructions regarding the resolved problem (assuming that the user has performed the actions specified and the problem has been resolved).

Figure 8:
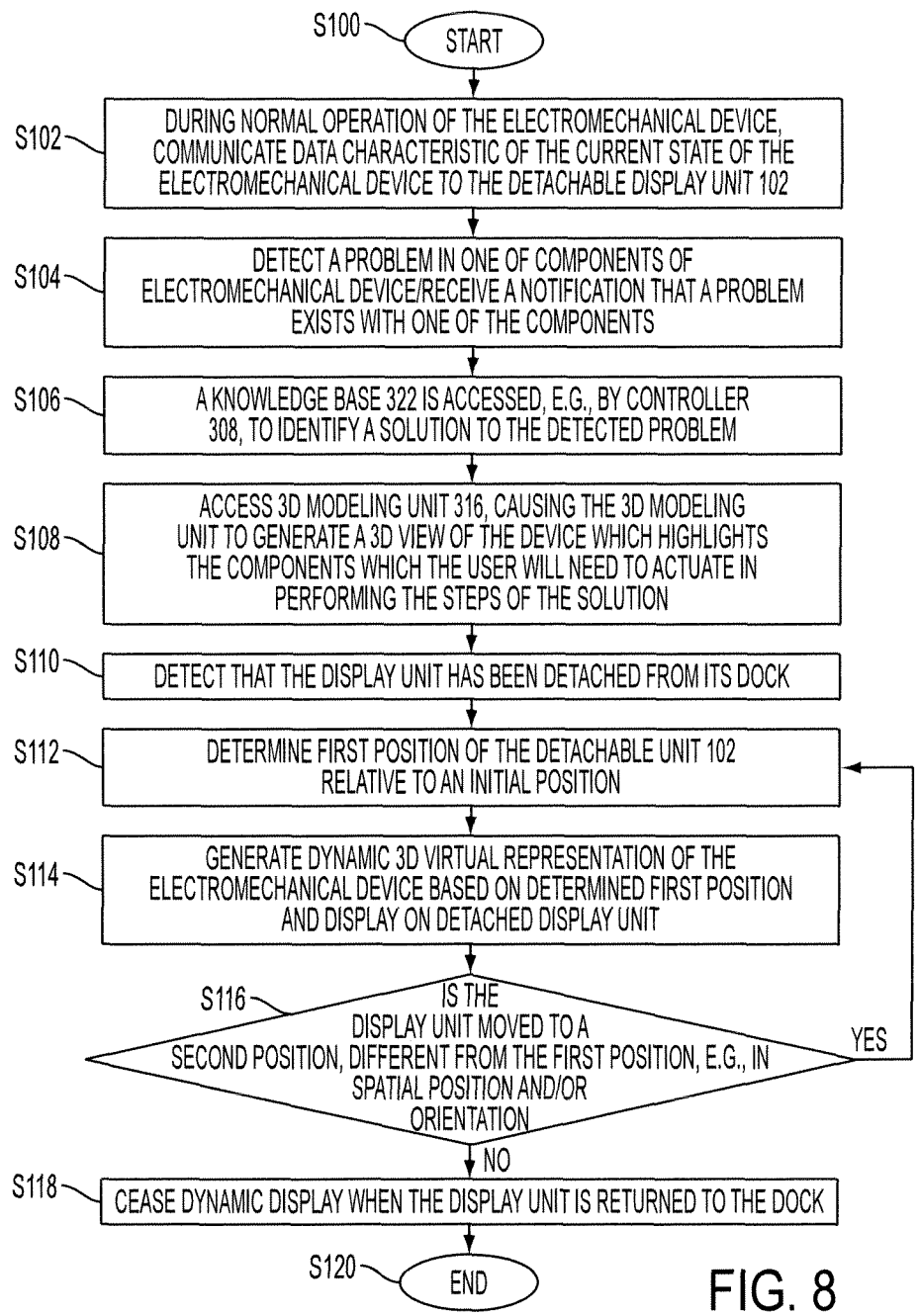
FIG. 8 illustrates a method which may be performed using the dynamic 3D virtual representation display system of FIG. 2.

FIG. 8 illustrates an exemplary method for generating a position responsive display of an electromechanical device, such as device 100. The method begins at S100.

At S102, during normal operation of the electromechanical device, data characteristic of the current state of the electromechanical device is communicated to the detachable display unit 102. The data may include, for example, user-selectable parameters for a job, such as printing, faxing, copying, depending on what functions are available on the device, such as the type of paper selectable, number of copies, etc. Once selected, the display may show the progress of a job, such as the number of copes to be printed, whether a fax is being sent etc.

At S104 the electromechanical device detects a problem in one of its components or receives a notification input by a user that a problem exists with one of the components.

At S106, a knowledge base 322 is accessed, e.g., by controller 308, to identify a solution to the detected problem.

At S108, the 3D modeling unit 316 is accessed, e.g., by the controller 308, which causes the 3D modeling unit to generate a 3D view of the device which highlights the components which the user will need to actuate in performing the steps of the solution. At this point, the data communicated to the display device may include the detected problem and one or more candidate solutions.

At S110, a detection that the display unit had been detached from its dock is made, e.g., by the sensor 304 and relayed to the position control unit 302.

At S112, a first current position of the unit 102 is determined, e.g., the 3D spatial position and orientation of the detachable display unit relative to a base position, such as the dock position.

At S114 a dynamic 3D virtual representation of the electromechanical device is generated and displayed, based on changes in the determined 3D spatial position and/or orientation. Relevant components to be actuated by the user are highlighted in the display. The user can thus view the virtual representation and the actual components of the MFD to be actuated contemporaneously (or virtually contemporaneously). Data characteristic of the current state of the electromechanical device may be updated as user actions are detected and communicated to the detachable display unit.

At S116, if the display unit is moved to a new current position, different from the first current position, e.g., in spatial position and/or orientation, S112 and S114 are repeated.

At S118, when the display unit is returned to the dock, the dynamic 3D representation which changes in relation to the position of the display unit, is discontinued and the display unit returns to its normal operating mode.

The method ends at S120.

The method illustrated in FIG. 8 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 8, can be used to implement the method for generating a dynamic 3D display.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A detachable display unit comprising:
   a communication link which communicates data between the display unit and an associated electromechanical device, the data being characteristic of a current state of at least one component of the associated electromechanical device, the component being actionable by a user;
   at least one position sensor which provides position information for determining a current position of the display unit, relative to the electromechanical device, when detached from the associated electromechanical device;
   a graphical user interface which displays a dynamic virtual representation, representing the component of the associated electromechanical device which is actionable by the user, based on the determined current position of the display unit, relative to the electromechanical device, the dynamic virtual representation guiding the user to perform actions on the user-actuable component of the device; and
   wherein when the data characteristic of a current state relates to a problem with the electromechanical device, the graphical user interface displays visual indicators for indicating a user-actuable component of the electromechanical device represented on the dynamic virtual representation where a user action is suggested to resolve the problem.

2. The display unit of claim 1, wherein the position sensor includes a 3-axis accelerometer which measures acceleration vectors in three orthogonal directions.

3. The display unit of claim 1, wherein the communication link is at least one of a wired or wireless link.

4. The display unit of claim 1, wherein the display unit is in a location remote from the user-actuable component, visual indicators guide a user to position the display unit closer to the user-actuable component.

5. The display unit of claim 1, wherein the graphical user interface displays a list of instructions to guide a user in performing at least one user action on the at least one user-actionable component represented in the visual representation for resolving a problem with the electromechanical device.

6. The display unit of claim 1, wherein the graphical user interface includes a pause function which maintains the current virtual representation irrespective of changes in the determined current position.

7. The display unit of claim 1, wherein the position sensor determines the spatial position and orientation of the display unit.

8. The display unit of claim 1, wherein the virtual representation is a three dimensional virtual representation.

9. In combination an electromechanical device and the display unit of claim 1 linked thereto.

10. The electromechanical device of claim 9, further comprising a docking assembly for receiving the detachable display unit and from which the display unit is detachable and movable to the current position spaced from the docking assembly.

11. The electromechanical device of claim 10, further comprising a wired link communicatively connecting the detachable display device with a display system of the electromechanical device which generates the dynamic virtual representation when the display unit is in the current position spaced from the docking assembly.

12. A method for generating a display of an electromechanical device comprising:
    communicating data characteristic of a current state of an electromechanical device to a detachable display unit;
    when the detachable display unit is in a position detached from the electromechanical device, determining a current position of the detachable display unit, relative to the electromechanical device;
    generating a dynamic virtual representation of the electromechanical device based on the determined current position;
    displaying the dynamic virtual representation on the detached display unit;
    detecting that a component of the electromechanical device has a problem for which there is at least one user-implementable solution; and
    displaying at least one of the at least one user implementable solutions on the display unit.

13. The method of claim 12, wherein the determining of the current position comprises:
    measuring acceleration vectors of the display unit in three orthogonal directions; and
    determining a spatial position and orientation of the detached display unit based on the measured acceleration vectors.

14. The method of claim 12, wherein the data is communicated over at least one of a wired link and a wireless link.

15. The method of claim 12, further comprising detecting that the display unit is detached from the electromechanical device and initiating generation of the dynamic virtual representation in response to the determined current position.

16. The method of claim 12, further comprising displaying the component which has a problem as at least one of highlighted and tagged.

17. The method of claim 12, further comprising displaying visual indicators on the display unit for indicating a section of the electromechanical device where a user action is requested.

18. The method of claim 17, wherein the visual indicators guide a user to position the display unit closer to a user-actuable component referred to in the at least one user-implementable solution such that the virtual representation shows the user-actuable component, the display unit showing further detailed instructions after the display unit has been positioned in close proximity to the user-actuable component.

19. A computer program product comprising a non-transitory computer-readable medium encoding instructions, which when executed by a computer, perform the method of claim 12.

20. An electromechanical device comprising:
    a detachable display unit comprising:
       a graphical user interface, and
       at least one position sensor which determines at least one of a spatial position and an orientation of the display unit, relative to a base position of the display unit;
    a docking assembly which selectively receives the detachable display unit in the base position; and
    a display system which generates a dynamic virtual representation of the electromechanical device, including indicators which guide a user to position the display unit closer to a user-actuable component, the dynamic virtual representation changing based on changes in the determined at least one of the spatial position and orientation of the display unit and displays the dynamic virtual representation on the graphical user interface.

21. The electromechanical device of claim 20, further comprising:

a sensor which transmits a signal to the display system when the display unit is detached from the docking assembly; and wherein the display system invokes the dynamic virtual representation upon receipt of the sensor signal.

22. The electromechanical device of claim 20, further comprising:

a plurality of component sensors communicatively connected to the display system, each component sensor communicating signals representative of a status of a respective component of the electromechanical device.

23. The electromechanical device of claim 22, wherein the display system detects a problem with the user-actuable component based at least in part on the component sensor signals and causes visual indicators to be displayed on the graphical user interface for indicating a user action on the component which is suggested to resolve the problem.

24. The electromechanical device of claim 20, wherein the electromechanical device comprises an image rendering device.

25. The display unit of claim 1, wherein the display unit represents the user-actuable component as at least one of highlighted and tagged in the dynamic virtual representation of the electromechanical device.

26. The electromechanical device of claim 20, wherein when the detachable display unit is in the base position it is operable to control the operation of the electromechanical device.

* * * * *